(12) United States Patent
Morii

(10) Patent No.: US 7,390,528 B2
(45) Date of Patent: Jun. 24, 2008

(54) METHOD FOR FORMING FUNCTIONAL POROUS LAYER, METHOD FOR MANUFACTURING FUEL CELL, ELECTRONIC DEVICE, AND AUTOMOBILE

(75) Inventor: Katsuyuki Morii, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 10/791,789

(22) Filed: Mar. 4, 2004

(65) Prior Publication Data

US 2004/0202780 A1 Oct. 14, 2004

(30) Foreign Application Priority Data

Mar. 31, 2003 (JP) ............... 2003-095967

(51) Int. Cl.
- *H01M 4/88* (2006.01)
- *H01M 4/86* (2006.01)
- *H01M 4/90* (2006.01)
- *H01M 4/92* (2006.01)
- *H01M 8/10* (2006.01)

(52) U.S. Cl. ............ 427/115; 429/40; 502/101

(58) Field of Classification Search ............ 429/40; 427/115, 122; 502/185, 101
See application file for complete search history.

(56) References Cited

U.S. PATENT DOCUMENTS

| | | | |
|---|---|---|---|
| 6,153,323 A * | 11/2000 | Colbow et al. ............ 429/12 |
| 6,183,898 B1 | 2/2001 | Koschany et al. |
| 6,187,467 B1 | 2/2001 | Zhang et al. |
| 6,524,736 B1 | 2/2003 | Sompalli et al. |
| 6,753,108 B1 * | 6/2004 | Hampden-Smith et al. .... 429/44 |
| 2003/0044669 A1 | 3/2003 | Hidaka et al. |
| 2003/0100824 A1 * | 5/2003 | Warren et al. ............ 600/407 |
| 2003/0143444 A1 * | 7/2003 | Liu et al. ............ 429/19 |
| 2004/0213902 A1 * | 10/2004 | Ajiki et al. ............ 427/115 |

FOREIGN PATENT DOCUMENTS

| | | |
|---|---|---|
| DE | 19914680 | 12/2000 |
| JP | A 02-085387 | 3/1990 |
| JP | A 07-134996 | 5/1995 |
| JP | A 08-010627 | 1/1996 |
| JP | A 8-88008 | 4/1996 |
| JP | A 09-245802 | 9/1997 |
| JP | A 10-340731 | 12/1998 |
| JP | A 11-246987 | 9/1999 |
| JP | A 2000-500910 | 1/2000 |

(Continued)

*Primary Examiner*—Gregg Cantelmo
(74) *Attorney, Agent, or Firm*—Oliff & Berridge, PLC

(57) ABSTRACT

To provide an efficient method to form a functional porous layer, a functional material being supported on a porous material such that the content of the functional material has a desired concentration distribution in the depth direction of the porous layer, a method to manufacture a fuel cell applying the above method to form a reacting layer and an electronic device and an automobile having the fuel cell manufactured by the method as a power supply. A method to form a functional porous layer including a functional material being supported on a porous material. The method includes applying a plurality of solutions or dispersions containing the functional material, the solutions or the dispersions having different surface tensions, to a porous layer to control the permeation of the functional material in the depth direction of the porous layer according to the difference in the surface tensions.

22 Claims, 10 Drawing Sheets

FOREIGN PATENT DOCUMENTS

| | | |
|---|---|---|
| JP | A 2001-216972 | 8/2001 |
| JP | A 2002-184415 | 6/2002 |
| JP | A 2002-528866 | 9/2002 |
| JP | A 2002-298860 | 10/2002 |
| JP | A 2003-041031 | 2/2003 |

* cited by examiner

METHOD FOR FORMING FUNCTIONAL POROUS LAYER, METHOD FOR MANUFACTURING FUEL CELL, ELECTRONIC DEVICE, AND AUTOMOBILE

BACKGROUND OF THE INVENTION

1. Field of Invention

The present invention relates to a method to form a functional porous layer, a functional material being supported such that the content of the functional material varies in the depth direction of the porous layer, to a method to manufacture a fuel cell applying the above method to form a reaction layer, and to an electronic device and an automobile having the fuel cell manufactured by the method as a power supply.

2. Description of Related Art

A fuel cell including an electrolyte membrane, an electrode (anode) disposed adjacent to one face of the electrolyte membrane, and an electrode (cathode) disposed adjacent to the other face of the electrolyte membrane is well known in the related art. For example, in a solid polymer electrolyte fuel cell, which includes an electrolyte membrane composed of a solid polymer electrolyte membrane, the following reactions are performed. On the anode side of the fuel cell, hydrogen gas splits into hydrogen ions and electrons, the electrons are conducted to the cathode side, and the hydrogen ions are moved in the electrolyte membrane to the cathode side. On the cathode side of the fuel cell, oxygen gas, the hydrogen ions, and the electrons are allowed to react to form water molecules.

In this solid electrolyte fuel cell, each of the electrodes generally includes a reaction layer composed of metal microparticles, which are a reaction catalyst of reactive gases, a gas diffusion layer composed of carbon microparticles disposed adjacent to the reaction layer toward a substrate, and a current-collecting layer composed of a conductive material disposed between the gas diffusion layer and the substrate. On one substrate (first substrate), hydrogen gas passes through gaps between the carbon microparticles of the gas diffusion layer and is uniformly diffused. The hydrogen gas is then allowed to react at the reaction layer to form electrons and hydrogen ions. The electrons are collected in the current-collecting layer and are conducted to a current-collecting layer on the other substrate (second substrate). The hydrogen ions are moved to a reaction layer on the second substrate through a solid polymer electrolyte membrane, and then allowed to react with electrons that are conducted from the current-collecting layer, and oxygen gas to form water molecules.

According to this fuel cell, for example, the following methods to form the reaction layer are known in the related art. (a) A paste to form a catalyst layer of an electrode prepared by mixing a catalyst supported on carbon, a solution of polymer electrolyte and an organic solvent is applied on a substrate (polytetrafluoroethylene sheet) and the substrate is dried. The dried paste on the substrate is bonded by pressing on an electrolyte membrane with heating. The substrate is then stripped off, thereby transferring the catalyst layer (reaction layer) to the electrolyte membrane Japanese Unexamined Patent Application Publication No. 08-88008. (b) A solution of electrolyte containing a solid catalyst supported on carbon particles is sprayed on a carbon layer, which is used as an electrode and the solvent in the solution is volatilized, thereby forming the reaction layer Japanese Unexamined Patent Application Publication No. 2002-298860.

However, these methods include many steps and are complicated. Furthermore, applying the catalyst uniformly and applying a predetermined amount of the catalyst to a predetermined position accurately are difficult to achieve. Unfortunately, the above methods decrease a characteristic, i.e. power density of the fuel cell and increase the production cost because of the increasing use of an expensive catalyst, such as platinum.

SUMMARY OF THE INVENTION

Accordingly, the present invention provides an efficient method to form a functional porous layer, a functional material being supported on a porous material such that the content of the functional material has a desired concentration distribution in the depth direction of the porous layer, a method to manufacture a fuel cell applying this method to form a reacting layer, and an electronic device and an automobile having the fuel cell manufactured by this method as a power supply.

As a result of intensive study to address the above problems, the present inventors have found a method to apply a plurality of solutions or dispersions containing a functional material, the solutions or the dispersions having different surface tensions, to a porous layer to control the permeation of the solutions or the dispersions containing the functional material in the depth direction of the porous layer according to the difference in the surface tensions. Furthermore, the present inventors have found that a reaction layer in which metal microparticles are supported on carbonaceous particles such that the content of the metal microparticles varies in the depth direction of the porous layer composed of the carbonaceous particles can be efficiently formed by applying this method to form the reaction layer of a fuel cell.

According to a first aspect of the present invention, a method to form a functional porous layer, a functional material being supported on a porous material is provided. The method includes applying a plurality of solutions or dispersions containing the functional material, the solutions or the dispersions having different surface tensions, to a porous layer to control the permeation of the functional material in the depth direction of the porous layer according to the difference in the surface tensions.

A method to form a functional porous layer according to an aspect of the present invention may include applying the solutions or the despersions containing the functional material, the solution or the dispersions having different surface tensions, to the porous layer and removing solvents in the solutions or the dispersions.

According to a method to form a functional porous layer of the present invention, the functional porous layer may be formed by supporting the functional material on the porous material such that the content of the functional material varies in the depth direction of the porous layer.

According to a method to form a functional porous layer of an aspect of the present invention, the applying step to apply the solutions or the dispersions containing the functional material to the porous layer to impregnate the solutions or the dispersions containing the functional material in the porous layer may be repeated a plurality of times for at least one of the solutions or dispersions having different surface tensions. Furthermore, each of the solutions or the dispersions having different surface tensions preferably has different concentrations of the functional material.

The method to form a functional porous layer according to an aspect of the present invention may include applying a first solution or a first dispersion containing the functional material to the porous layer to impregnate the first solution or the first dispersion containing the functional material in the porous layer; and applying a second solution or a second dispersion containing the functional material to the porous layer to impregnate the second solution or the second dispersion containing the functional material in the porous layer, the second solution or the second dispersion having a surface tension larger than the surface tension of the first solution or the first dispersion.

According to a method to form a functional porous layer of an aspect of the present invention, the solutions or the dispersions containing the functional material, the solutions or the dispersions having different surface tensions, may be prepared by dissolving or dispersing the functional material in different solvents. The solution or the dispersion containing the functional material may include at least one metal microparticle selected from the group including platinum, rhodium, ruthenium, iridium, palladium, osmium, and an ally composed of two or more of those elements or at least one compound of the metal.

According to a method to form a functional porous layer of an aspect of the present invention, the porous layer may be composed of carbonaceous particles. The functional porous layer may be composed of carbonaceous particles that support microparticles of at least one metal selected from the group including platinum, rhodium, ruthenium, iridium, palladium, and osmium, and an ally composed of two or more of those elements. The functional porous layer may be at least one of a first reaction layer and a second reaction layer of a fuel cell that includes a first current-collecting layer, the first reaction layer, an electrolyte membrane, the second reaction layer, and a second current-collecting layer in that order.

Furthermore, according to a method to form a functional porous layer of an aspect of the present invention, the solution or the dispersion containing the functional material may be applied with a discharger.

According to a second aspect of the present invention, a method to manufacture a fuel cell including a first current-collecting layer, a first reaction layer, an electrolyte membrane, a second reaction layer and a second current-collecting layer, the method includes applying a plurality of solutions or dispersions containing a reaction layer forming material, the solutions or the dispersions having different surface tensions, to a porous layer composed of carbonaceous particles; and removing solvents in the solutions or the dispersions to form at least one of the first reaction layer and the second reaction layer.

According to a method to manufacture a fuel cell of an aspect of the present invention, at least one of the first reaction layer and the second reaction layer may be composed of a reaction layer forming material supported on the carbonaceous particles, the content of the reaction layer forming material varying in the depth direction of the porous layer composed of the carbonaceous particles.

According to a method to manufacture a fuel cell of an aspect of the present invention, in order to form at least one of the first reaction layer and the second reaction layer, the applying step to apply the solutions or the dispersions containing the reaction layer forming material to the porous layer composed of carbonaceous particles to impregnate the solutions or the dispersions containing the reaction layer forming material into the porous layer is may be repeated a plurality of times for at least one of the solutions or dispersions having different surface tensions.

According to a method to manufacture a fuel cell of an aspect of the present invention, at least one of the first reaction layer and the second reaction layer may be formed by applying a first solution or a first dispersion containing the reaction layer forming material to the porous layer composed of the carbonaceous particles to impregnate the first solution or the first dispersion containing the reaction layer forming material in the porous layer; and applying a second solution or a second dispersion containing the reaction layer forming material to the porous layer composed of the carbonaceous particles to impregnate the second solution or the second dispersion containing the reaction layer forming material in the porous layer, the second solution or the second dispersion having a surface tension larger than the surface tension of the first solution or the first dispersion.

According to a method to manufacture a fuel cell of an aspect of the present invention, the solutions or the dispersions containing the reaction layer forming material having different surface tensions may be prepared by dissolving or dispersing the reaction layer forming material in different solvents.

A method for manufacturing a fuel cell of an aspect of the present invention may include, in order to form at least one of the first reaction layer and the second reaction layer, applying carbonaceous particles on the first current-collecting layer or the second current-collecting layer to form the porous layer composed of the carbonaceous particles, applying the solutions or the dispersions containing the reaction layer forming material to the porous layer composed of the carbonaceous particles, the solutions or the dispersions having different surface tensions, and removing the solvents in the solutions or the dispersions.

According to the method to manufacture a fuel cell of an aspect of the present invention, the solution or the dispersion containing the reaction layer forming material may be applied with a discharger.

According to a method to manufacture a fuel cell of an aspect of the present invention, at least one of the first reaction layer and the second reaction layer may be composed of the carbonaceous particles that support metal microparticles, and the content of the metal microparticles in the reaction layer may be larger at the electrolyte membrane than at the current-collecting layer.

According to a third aspect of the present invention, an electronic device provided with a fuel cell manufactured by a method of an aspect of the present invention as a power supply is provided.

According to a fourth aspect of the present invention, an automobile provided with a fuel cell manufactured by a method of an aspect of the present invention as a power supply is provided.

According to a method to form the functional porous layer of an aspect of the present invention, the permeation of the functional material in the depth direction of the porous layer can be readily controlled according to the difference in the surface tensions by applying a plurality of solutions or dispersions containing the functional material having different surface tensions to a porous layer. Therefore, a functional porous layer in which the distribution of the functional material varies in the depth direction is readily formed.

In a method to form a functional porous layer according to an aspect of the present invention, a solution or a dispersion containing the functional material having a relatively small surface tension may be applied, and a solution or a dispersion containing the functional material having a relatively large surface tension may then be applied. In this case, a functional porous layer is readily formed in which the distribution of the functional material varies so as to be gradually smaller in the depth direction.

In a method to form a functional porous layer according to an aspect of the present invention, the solutions or the dispersions containing a functional material having different surface tensions may be prepared by dissolving or dispersing the single functional material in different solvents. In this case, a functional porous layer, in which the distribution of the single functional material varies in the depth direction, and the distribution of the functional material may vary so as to be gradually smaller in the depth direction, is readily formed.

In a method to form a functional porous layer according to an aspect of the present invention, applying a solution or dispersion containing the functional material to the porous layer to impregnate the functional material in the porous layer may be repeated multiple times by using a plurality of solutions or dispersions containing the functional material having different surface tensions. That is, the surface tensions of the solutions or dispersions containing the functional material may be arbitrarily determined, the solutions or dispersions containing the functional material having the different surface tensions may be arbitrarily mixed, or the amount of the solutions or dispersions containing the functional material applied may be arbitrarily determined. Accordingly, a functional porous layer having a desired concentration distribution (i.e., presence distribution) of the functional material in the depth direction is readily formed.

In a method to form a functional porous layer according to an aspect of the present invention, the porous layer may be composed of carbonaceous particles and the functional porous layer may include at least one metal microparticle selected from the group including platinum, rhodium, ruthenium, iridium, palladium, osmium, and an alloy composed of two or more of these elements. In this case, a functional porous layer wherein the metal microparticles being supported on the porous carbonaceous particles such that the distribution of the metal microparticles varies in the depth direction and the distribution of the metal microparticles may vary so as to be gradually smaller in the depth direction in the porous layer composed of the carbonaceous particles, is readily formed.

A method to form a functional porous layer of an aspect of the present invention may be applied to form the first reaction layer or the second reaction layer of a fuel cell that includes the first current-collecting layer, the first reaction layer, the electrolyte membrane, the second reaction layer, and the second current-collecting layer in that order.

In a method to form a functional porous layer according to an aspect of the present invention, the solution or the dispersion containing the functional material may be applied with a discharger. This method allows the functional material to be accurately applied at the predetermined positions, thus readily forming a functional porous layer having a desired profile. Furthermore, this method allows a required amount of the solution or the dispersion containing the functional material to be applied at the predetermined positions. Accordingly, an excess amount of the functional material is not applied, thus reducing the quantity of the functional material required.

According to a method to manufacture a fuel cell of an aspect of the present invention, a fuel cell having a reaction layer is readily and efficiently formed in which the distribution of a reaction layer forming material varies in the depth direction.

In a method to manufacture a fuel cell of an aspect of the present invention, a solution or a dispersion containing the reaction layer forming material having a relatively small surface tension may be applied and a solution or a dispersion containing the reaction layer forming material having a relatively large surface tension may then be applied. In this case, a fuel cell having the reaction layer is readily and efficiently formed in which the distribution of the reaction layer forming material varies so as to be gradually smaller in the depth direction.

In a method to manufacture a fuel cell of an aspect of the present invention, the reaction layer forming material may be applied with a discharger. This method allows a reaction layer having a desired concentration distribution (i.e., presence distribution) of the reaction layer forming material in the depth direction to be efficiently formed. Furthermore, the amount of expensive reaction layer forming material required is decreased compared with a typical method to form a reaction layer, the reaction layer forming material being applied on the entire surface of the substrate. Accordingly, this method allows a fuel cell having a high power density to be manufactured with low cost.

Furthermore, according to a method to manufacture a fuel cell of an aspect of the present invention, at least one of the first reaction layer and the second reaction layer may be composed of metal microparticles supported on the carbonaceous particles and may be efficiently formed such that the content of the metal microparticles in the reaction layer is larger at the electrolyte membrane than at the current-collecting layer.

In the fuel cell manufactured by a method of an aspect of the present invention, reaction layers having a uniform and desired amount of metal microparticles are formed efficiently. Thus, the fuel cell can be manufactured at low cost and has high power density, i.e. a superior characteristic.

The fuel cell manufactured by a method of an aspect of the present invention is useful as a power supply of, for example, an electronic device and an automobile.

An electronic device according to an aspect of the present invention is provided with the fuel cell manufactured by a method of an aspect of the present invention as a power supply. The electronic device according to an aspect of the present invention is provided with clean energy as a power supply that considers the global environment properly.

Furthermore, an automobile according to an aspect of the present invention is provided with the fuel cell manufactured by a method of an aspect of the present invention as a power supply. The automobile according to an aspect of the present invention is provided with clean energy as a power supply that considers the global environment properly.

DETAILED DESCRIPTION OF EXEMPLARY EMBODIMENTS

A method to form a functional porous layer, a method to manufacture a fuel cell, an electronic device and an automobile having the fuel cell according to an aspect of the present invention will now be described in detail.

1) Method to Form Functional Porous Layer

According to an aspect of the present invention, a method to form a functional porous layer, wherein a functional material being supported on a porous material is provided. The method includes applying a plurality of solutions or dispersions containing the functional material, the solutions or dispersions having different surface tensions, to a porous layer to control the permeation of the functional material in the depth direction of the porous layer according to the difference in the surface tensions.

In an aspect of the present invention, the functional porous layer indicates a porous layer, a functional material being supported (or absorbed) on a porous material. In the method to form a functional porous layer of an aspect of the present invention, a porous layer is formed in which a functional material is located so as to have a predetermined concentration distribution in the depth direction. Furthermore, in a method to form a functional porous layer of an aspect of the present invention, a layer composed of a functional material may be formed on the surface of the porous layer.

Although the pore size of the porous layer according to an aspect of the present invention is not limited, the pore size generally ranges from the order of tens of nanometers to hundreds of nanometers.

According to an aspect of the present invention, the porous layer is composed of a porous material and any material that can support the functional material may be used. Preferable examples of the porous material include carbonaceous particles, such as carbon particles, carbon nano-tube, carbon nano-horn, and fullerene. The porous layer may be composed of one of the porous materials, or two or more of the porous materials. Furthermore, the porous layer may be formed on another layer, or may be composed of the porous layer itself.

A method to form the functional porous layer according to an aspect of the present invention includes applying a solution or a dispersion containing the functional material on the porous layer to impregnate the solution or the dispersion containing the functional material (hereinafter "a liquid containing the functional material") to the porous layer (hereinafter "step (I))", and removing a solvent in the solution or the dispersion (hereinafter "step (II))".

In step (I), a plurality of liquids containing the functional material having different surface tensions is applied on the porous layer. The functional material is impregnated such that the content of the functional material varies in the depth direction of the porous layer. The content of the functional material may vary gradually. The content of the functional material may be gradually decreased in the direction from the surface of the porous layer toward the inside of the porous layer.

In the case where a material (i.e., a solution or a dispersion) is impregnated with a porous layer, generally, a material having a large surface tension is impregnated into the shallower portion of the porous layer, whereas a material having a small surface tension can be impregnated into the deeper portion of the porous layer in the depth direction. The present invention utilizes this phenomenon. According to an aspect of the present invention, a plurality of liquids containing the functional material having different surface tensions is applied on the porous layer to impregnate the functional material into the porous layer, thereby forming a functional porous layer in which the functional material is located so as to have a desired concentration at a desired position in the depth direction of the porous layer.

According to an aspect of the present invention, first, a liquid containing the functional material having a relatively small surface tension may be applied on the porous layer to impregnate the liquid containing the functional material into the porous layer. Next, a liquid containing the functional material having a relatively large surface tension may be applied on the porous layer to impregnate the liquid containing the functional material into the porous layer. The reason for this is described below.

A liquid containing the functional material having a surface tension of A1 mN/m is applied on the porous layer to impregnate the liquid containing the functional material into the porous layer. Next, a liquid containing the functional material having a surface tension of A2 mN/m, where A2 is larger than A1 is applied on the porous layer to impregnate the liquid containing the functional material into the porous layer. When the liquid containing the functional material having a surface tension of A1 mN/m is used, the functional material is uniformly diffused in the range from the surface to a depth d1 of the porous layer. When the liquid containing the functional material having a surface tension of A2 mN/m is used, the functional material is uniformly diffused in the range from the surface to a depth d2 (d1>d2) of the porous layer. Accordingly, if both liquids that have the surface tensions of A1 and A2 include the same functional material, the content of the functional material is distributed so as to relatively decrease from the surface of the porous layer in the depth direction (i.e., to the depth d1) gradually.

When the solution or the dispersion containing the functional material is applied on the porous layer, the applied liquid is not diffused in the horizontal direction but is permeated in the depth direction of the porous layer. Therefore, even if a material having a large surface tension is applied, subsequent application of a solvent can control the depth of permeation of the functional material.

The method will now be described specifically.

A predetermined amount of a first solution or a first dispersion containing the functional material having a first concentration is applied on a porous layer. Next, a predetermined amount of a solvent is applied at the same position as the first solution or the first dispersion containing the functional material (a first step). Thus, the depth of permeation of the functional material into the porous layer can be controlled.

Subsequently, a predetermined amount of a second solution or a second dispersion containing the functional material having a second concentration is applied on the porous layer. Next, a predetermined amount of the solvent is applied at the same position as the second solution or the second dispersion containing the functional material (a second step). This process is repeated, thereby allowing the porous layer to have a concentration distribution of the functional material in the depth direction. In this case, removing the solvent (i.e., drying step) may be performed between the first step and the second step.

Although an example of two kinds of liquids containing functional material having different surface tensions is described in the present exemplary embodiment, three or more kinds of liquids having different surface tensions may be used, such that the surface tensions of the liquids containing the functional material varies stepwise.

According to an aspect of the present invention, any functional material that displays chemical reactivity, electrical conduction properties, and photoresponsivity, when being supported on a porous material may be used. Preferable examples of the functional material include at least one metal microparticle selected from the group including platinum, rhodium, ruthenium, iridium, palladium, osmium, and an alloy composed of two or more of these elements.

Although the solvent used to dissolve or disperse the functional material is not limited, examples of the solvent include water, alcohols, ketones, esters, ethers, aliphatic hydrocarbons, alicyclic hydrocarbons, and, aromatic hydrocarbons, and a mixture thereof.

A method to prepare the liquid containing the functional material having different surface tensions is not limited. For example, when platinum microparticle is used as the functional material, an organic solvent, for example, alcohols, glycerin, or ethylene glycol may be added to water at a predetermined ratio, or, for example, a surfactant may be added to water at a predetermined ratio. Thus, a dispersion containing the platinum microparticle that has a wide range of surface tensions from the surface tension of water to 20 mN/m can be prepared. Alternatively, the concentration of the solution or the dispersion containing the functional material may be changed, thereby preparing the solution or the dispersion having a predetermined surface tension.

According to an aspect of the present invention, the liquid containing the functional material is preferably applied with a discharger. A discharger, the same as a discharger 20*a* described later, may be used. Using the discharger in the application of the functional material allows the required amount of the liquid containing the functional material to be accurately applied at desired positions. In this case, the desired amount of the liquid containing the functional material can be accurately applied. Furthermore, the functional material can be accurately applied only at positions where the application and the impregnation of the functional material are required. Accordingly, this process allows the functional porous layer having a desired concentration distribution (in the depth direction and in the horizontal direction) of the functional material to be readily formed.

A discharger including a plurality of discharging nozzles may be used. In this case, for example, the liquid containing the functional material is applied on the entire area where the functional material is to be applied, so as to form predetermined gaps between applications. Next, when the liquid containing the functional material is further applied between the gaps, other discharging nozzles discharge the liquid containing the functional material. This discharger as a whole decreases the difference in the amount of application at one time between the discharging nozzles.

The liquid containing the functional material is preferably applied little by little (for example, 10 picoliters each) so as to form adequate gaps (for example, about 1 mm). After removal of the solvent, the degrees of precipitation of the functional material change. Therefore, the gaps between each application are preferably constant in order to produce a functional porous layer in which the functional material is uniformly dispersed.

Subsequently, in step (II) the solvent that dissolves or disperses the functional material is removed to form the porous layer wherein the functional material is supported (or absorbed).

In a general method to remove the solvent that dissolves or disperses the functional material, the solvent is heated and vaporized. In an aspect of the present invention, the solvent may be removed in as short a time and at as low a temperature as possible, because heating for a long time and at a high temperature may break the dispersion state of the functional material formed in step (I). Specifically, the solvent is preferably removed under reduced pressure and at a low temperature, preferably 100° C. or less.

The method to form the functional porous layer of an aspect of the present invention allows the functional porous layer, where the distribution of the functional material varies in the depth direction to be readily formed. The method to form the functional porous layer of an aspect of the present invention is preferably applied to form a reaction layer of a fuel cell described below.

2) Method to Manufacture Fuel Cell

According to an aspect of the present invention, a method to manufacture a fuel cell including a first current-collecting layer, a first reaction layer, an electrolyte membrane, a second reaction layer, and a second current-collecting layer is provided. The method includes applying a plurality of solutions or dispersions containing a reaction layer forming material, the solutions or the dispersions having different surface tensions, to a porous layer composed of carbonaceous particles; and removing solvents in the solutions or the dispersion to form at least one of the first reaction layer and the second reaction layer.

The method to manufacture a fuel cell of an aspect of the present invention may be performed by using an apparatus to manufacture a fuel cell (a fuel cell manufacturing line) shown in FIG. 1. The fuel cell manufacturing line in FIG. 1 includes dischargers, 20*a* to 20*m*, which are used in each step, a belt conveyor BC1 connecting the dischargers, 20*a* to 20*k*, a belt conveyor BC2 connecting the dischargers, 20*l* and 20*m*, a driving unit 58 to drive the belt conveyors BC1 and BC2, an assembling unit 60 to assemble the fuel cell, and a control unit 56 to control the overall fuel cell manufacturing line.

The dischargers, 20*a* to 20*k*, are arranged along the belt conveyor BC1 at predetermined intervals, and the dischargers, 20*l* and 20*m*, are arranged along the belt conveyor BC2 at a predetermined interval. The control unit 56 is connected to the dischargers, 20*a* to 20*k*, the driving unit 58, and the assembling unit 60.

In this fuel cell manufacturing line, the driving unit 58 drives the belt conveyor BC1, the belt conveyor BC1 carries a fuel cell substrate (hereinafter a substrate) to each of the dischargers, 20*a* to 20*k*, to perform each process at each of the dischargers, 20*a* to 20*k*. A control signal from the control unit 56 drives the belt conveyor BC2, the belt conveyor BC2 carries the substrate to each of the dischargers, 20*l* and 20*m*, to perform each process at each of the dischargers, 20*l* and 20*m*. The assembling unit 60 assembles the fuel cell using the substrate that is carried by the belt conveyors BC1 and BC2 based on control signals from the control unit 56.

Any ink-jet type discharger can be used as the dischargers, 20*a* to 20*m*. Examples of the discharger include a thermal discharger and a piezo discharger. In the thermal discharger, heating causes foaming and generates bubbles, thereby discharging droplets. In the piezo discharger, a compressed piezo device discharges droplets.

The discharger 20*a* shown in FIG. 2 is used in the present exemplary embodiment. The discharger 20*a* includes a tank 30 containing a discharging liquid 34, an ink-jet head 22 connecting to the tank 30 through a carrier pipe 32 of the discharging liquid, a table 28 that loads and carries the substrate having the discharged liquid, a suction cap 40 that absorbs surplus discharging liquid 34 remaining in the ink-jet head 22 to remove the surplus discharging liquid 34 from the ink-jet head 22, and a waste solution tank 48 that contains the surplus discharging liquid 34 absorbed by the suction cap 40.

The tank 30 contains the discharging liquid 34 such as a resist solution, and includes a level control sensor 36 therein that controls the height of a liquid level 34*a* of the discharging liquid 34 contained in the tank 30. The level control sensor 36 controls a difference h (hereinafter a water head value) in the heights between a tip 26*a* of a nozzle-formed surface 26 of the ink-jet head 22 and a level 34*a* in the tank 30 such that the water head value is kept within a predetermined range. For example, the level control sensor 36 controls the height of the level 34*a* such that the water head value is 25 mm±0.5 mm, thereby transmitting the discharging liquid 34 in the tank 30 to the ink-jet head 22 at a pressure within a predetermined range. Transmitting the discharging liquid 34 at a pressure within a predetermined range allows the required amount of discharging liquid 34 to be stably discharged from the ink-jet head 22.

The carrier pipe 32 of the discharging liquid includes a grounding connection 32*a* at the passage of the discharged liquid that reduces or prevents charging in the passage of the carrier pipe 32, and a release valve 32*b* of air in the head. The release valve 32*b* of air in the head is used to remove the discharging liquid in the ink-jet head 22 using a suction cap 40 described later.

The ink-jet head 22 includes a head 24, and the nozzle-formed surface 26 having a plurality of nozzles that discharges the discharging liquid 34. The nozzles formed on the nozzle-formed surface 26 discharge, for example, a resist solution that is applied on the substrate in order to form gas channels to supply a reactive gas thereon. The table 28 is removable in predetermined directions. The table 28 moves in the directions indicated by an arrow in FIG. 2, thus locating the substrate carried by the belt conveyer BC1 thereon, and taking the substrate in the discharger 20a.

The suction cap 40 is movable in the directions indicated by an arrow in FIG. 2. The suction cap 40 is adhered to the nozzle-formed surface 26 so as to surround the plurality of nozzles formed on the nozzle-formed surface 26, thereby forming a sealed space between the suction cap 40 and the nozzle-formed surface 26. Thus, the nozzles are sealed from the outside air. When the suction cap 40 removes the discharging liquid 34 in the ink-jet head 22, the release valve 32b is closed so as not to allow flow of the discharging liquid 34 from the direction adjacent to the tank 30. Then the suction cap 40 removes the discharging liquid 34. In this case, the flow rate of the removed discharging liquid 34 increases and air bubbles in the ink-jet head 22 can be quickly released.

The suction cap 40 includes a flow path thereunder, and a suction valve 42 is disposed in the flow path. The suction valve 42 functions to close the flow path in order to shorten the time required to balance the pressures (ambient pressure) between the lower side of the suction valve 42 and the upper side of the suction valve 42 adjacent to the ink-jet head 22. A detection sensor of suction force 44 that detects an abnormal suction, and a suction pump 46, such as a tube pump, are disposed in the flow path. The discharging liquid 34 removed and carried by the suction pump 46 is temporarily stored in the waste solution tank 48.

According to the present exemplary embodiment, the dischargers 20b to 20m are the same as the discharger 20a but the kinds of the discharging liquid 34 are different. Accordingly, the same symbols are used for the same components in each of the dischargers.

The steps of manufacturing a fuel cell using the fuel cell manufacturing line shown in FIG. 1 will now be described. FIG. 3 is a flowchart showing the method to manufacture a fuel cell that uses the fuel cell manufacturing line shown in FIG. 1.

As shown in FIG. 3, the fuel cell according to the present exemplary embodiment is manufactured by forming gas channels on a first substrate (S10, a first-gas-channel forming step); applying a first supporter material in the gas channels (S11, a first supporter material applying step); forming a first current-collecting layer (S12, a first current-collecting layer forming step); forming a first gas diffusion layer (S13, a first gas diffusion layer forming step); forming a first reaction layer (S14, a first reaction layer forming step); forming an electrolyte membrane (S15, an electrolyte membrane forming step); forming a second reaction layer (S16, a second reaction layer forming step); forming a second gas diffusion layer (S17, a second gas diffusion layer forming step); forming a second current-collecting layer (S18, a second current-collecting layer forming step); applying a second supporter material in second gas channels (S19, a second supporter material applying step); and laminating a second substrate having the second gas channels thereon (S20, an assembling step).

(1) First-Gas-Channel Forming Step (S10)

As shown in FIG. 4A, a rectangular first substrate 2 is prepared. The belt conveyer BC1 carries the substrate 2 to the discharger 20a. Any substrate, such as a silicon substrate used in a typical fuel cell, may be used as the substrate 2. A silicon substrate is used in the present exemplary embodiment.

The substrate 2 carried by the belt conveyer BC1 is disposed on the table 28 of the discharger 20a to be taken in the discharger 20a. In the discharger 20a, a resist solution provided in the tank 30 of the discharger 20a is applied on predetermined areas of the substrate 2 mounted on the table 28 through the nozzles disposed at the nozzle-formed surface 26. Thus, a resist pattern (the shaded areas in the figure) is formed on the surface of the substrate 2. As shown in FIG. 4B, the resist pattern is formed on the surface area of the substrate 2 where the first gas channels, to which a first reactive gas is supplied, are not formed.

The belt conveyer BC1 carries the substrate 2 having the predetermined resist pattern at the predetermined position thereon to the discharger 20b. The substrate 2 is disposed on the table 28 of the discharger 20b to be taken in the discharger 20b. In the discharger 20b an etchant, such as aqueous hydrofluoric acid solution provided in the tank 30, is applied on the surface of the substrate 2 through nozzles disposed on the nozzle-formed surface 26. The etchant etches the surface of the substrate 2 on which the resist pattern is not formed. As shown in FIG. 5(A), a first gas channel having a U-shape in cross-section is formed from one side face to the other side face of the substrate 2. Referring to FIG. 5(B), a cleaning unit (not shown in the figure) cleans the surface of the substrate 2 having the gas channels thereon to remove the resist pattern. The substrate 2 having the gas channels thereon is moved from the table 28 to the belt conveyer BC1. The belt conveyer BC1 carries the substrate 2 to the discharger 20c.

(2) First Supporter Material Applying Step (S11)

Subsequently, the first supporter material that supports the first current-collecting layer is applied in the first gas channels formed on the substrate 2. In order to apply the first supporter material, first, the substrate 2 is disposed on the table 28 to be taken in the discharger 20c. The discharger 20c then discharges a first supporter material 4 provided in the tank 30 in the first gas channels formed on the substrate 2 through nozzles disposed on the nozzle-formed surface 26.

The first supporter material is not limited, as long as the first supporter material is inert to the first reactive gas, prevents the first current-collecting layer from falling on the first gas channels, and does not prevent the first reactive gas from diffusing to the first reaction layer. Examples of the first supporter material include carbon particles and glass particles. Porous carbon having a diameter of about 1 μm to about 5 μm is used in the present exemplary embodiment. The use of porous carbon having a predetermined diameter as the supporter material allows the reactive gas supplied through the gas channels to diffuse upward through the clearances between the porous carbons. Accordingly the reactive gas flows smoothly.

FIG. 6 is an end view of the substrate 2 on which the first supporter material 4 is applied. The substrate 2 on which the first supporter material 4 is applied is moved from the table 28 to the belt conveyer BC1. The belt conveyer BC1 carries the substrate 2 to the discharger 20d.

(3) First Current-Collecting Layer Forming Step (S12)

Subsequently, the first current-collecting layer that collects electrons generated by reaction of the first reactive gas is formed on the substrate 2. The substrate 2, carried by the belt conveyer BC1 to the discharger 20d, is then disposed on the table 28 and is taken in the discharger 20d. In the discharger 20d, a predetermined amount of a current-collecting layer forming material provided in the tank 30 is discharged on the substrate 2 through nozzles disposed on the nozzle-formed surface 26, thereby forming the first current-collecting layer having a predetermined pattern.

Any materials containing a conductive material may be used as the current-collecting layer forming material. Examples of the conductive material include copper, silver, gold, platinum, and aluminum. These conductive materials may be used alone or in combination. The current-collecting layer forming material is prepared by dispersing at least one element of these conductive materials into an appropriate solvent, and if necessary, by adding a dispersing agent to the dispersion.

According to the present exemplary embodiment, the current-collecting layer forming material is applied with the discharger 20*d*. Accordingly, a predetermined amount of the material can be precisely applied at the predetermined positions by the simple operation. This method allows the quantity of material used to form the current-collecting layer to be reduced drastically, and the current-collecting layer having a predetermined pattern (i.e., shape) to be formed efficiently. According to this method, the current-collecting layer forming material can be applied such that the intervals between applications vary depending on the positions, thereby readily controlling the permeability of the reactive gas. Furthermore, this method allows the kinds of current-collecting layer forming material to be changed freely depending on the positions of the application.

FIG. 7 is an end view of the substrate 2 on which a first current-collecting layer 6 is formed. As shown in FIG. 7, the first current-collecting layer 6 is supported by the first supporter material 4 in the first gas channels formed on the substrate 2, so that the first current-collecting layer 6 does not fall in the first gas channels. The substrate 2 having the first current-collecting layer 6 thereon is moved from the table 28 to the belt conveyor BC1. The belt conveyor BC1 carries the substrate 2 to the discharger 20*e*.

(4) First Gas Diffusion Layer Forming Step (S13)

Subsequently, the first gas diffusion layer is formed on the current-collecting layer on the substrate 2. The substrate 2, carried by the belt conveyor BC1 to the discharger 20*e*, is disposed on the table 28 to be taken in the discharger 20*e*. In the discharger 20*e*, a gas diffusion layer forming material provided in the tank 30 of the discharger 20*e* is discharged on predetermined positions on the surface of the substrate 2 disposed on the table 28 through nozzles disposed on the nozzle-formed surface 26, thereby forming the first gas diffusion layer.

Carbon particles are generally used as the gas diffusion layer forming material. Other examples of the gas diffusion layer forming material include carbon nano-tube, carbon nano-horn, and fullerene. The gas diffusion layer is formed using the discharger 20*e* in the present exemplary embodiment. Therefore, for example, the gas diffusion layer forming material may be discharged such that each application has a large interval (the order of tens of micrometers) in the area adjacent to the current-collecting layer, while each application has a small interval (the order of tens of nanometers) in the area adjacent to the surface of the gas diffusion layer. In this case, the gas diffusion layer has channels having a large width in the vicinity of the substrate, thereby decreasing the diffusion resistance of the reactive gas as much as possible. On the other hand, the gas diffusion layer has channels having a small width in the vicinity of the reaction layer (i.e., the area adjacent to the surface of the gas diffusion layer). Thus, the above gas diffusion layer is readily formed. In the gas diffusion layer, carbon microparticles may be used in the area adjacent to the substrate, whereas a material that has a low gas diffusing capacity but has a superior catalyst supporting capacity may be used in the area adjacent to the surface of the gas diffusion layer.

FIG. 8 is an end view of the substrate 2 on which a first gas diffusion layer 8 is formed. As shown in FIG. 8, the first gas diffusion layer 8 is formed on the entire surface of the substrate 2 so as to cover the first current-collecting layer 6 formed on the substrate. The gas diffusion layer 8 is a porous layer, and as described in the subsequent step, the gas diffusion layer 8 supports a part of the gas diffusion layer 8 or a reaction layer forming material. The substrate 2 having the first gas diffusion layer 8 is moved from the table 28 to the belt conveyor BC1. The belt conveyor BC1 carries the substrate 2 to the discharger 20*f*.

(5) First Reaction Layer Forming Step (S14)

Subsequently, the first reaction layer is formed on the substrate 2. The first reaction layer is formed such that the first reaction layer is electrically connected to the first current-collecting layer 6 through the gas diffusion layer 8. The substrate 2 carried by the belt conveyor BC1 to the discharger 20*f* is disposed on the table 28 to be taken in the discharger 20*f*.

A predetermined amount of a solution or a dispersion, containing the reaction layer forming material having a different surface tension, provided in the tank 30 of the discharger 20*f*, is then discharged at predetermined areas on the gas diffusion layer 8 to form the first reaction layer. The solution or the dispersion containing the reaction layer forming material discharged on the gas diffusion layer 8 is impregnated into the gas diffusion layer 8. This step is repeated. Thus, the reaction layer forming material is coated on the gas diffusion layer 8. At the same time, these steps allow the content of the reaction layer forming material in a surface portion of the gas diffusion layer 8 to vary gradually in the direction from the surface portion to the portion adjacent to the substrate.

Examples of the solution or the dispersion containing the reaction layer forming material include (a) a solution containing a metallic compound (a metal complex, a metal salt), (b) a dispersion containing a carbon that supports a metal, i.e., a carbon support in which a metal hydroxide is absorbed, and (c) a dispersion containing metal microparticles.

Examples of the metallic compound, the metal hydroxide, and the metal microparticles used in the above solution or the dispersion (a) to (c) include at least one metal selected from the group including, for example, platinum, rhodium, ruthenium, iridium, palladium, osmium, and an alloy thereof. In particular, platinum is preferably used.

When solutions or dispersions containing the reaction layer forming materials, the solutions or the dispersions having different surface tensions are charged with the discharger, only the discharger 20*f* may discharge the solutions or the dispersions containing the reaction layer forming materials, the solutions or the dispersions having different surface tensions. Alternatively, different dischargers may discharge each of the solutions or the dispersions containing the reaction layer forming materials, the solutions or the dispersions having different surface tensions. For example, the discharger 20*f* may discharge a solution or a dispersion containing the reaction layer forming material, the solutions or the dispersions having a relatively small surface tension, and then a discharger 20*f* (not shown in the figure) may discharge a solution or a dispersion containing the reaction layer forming material, the solutions or the dispersions having a relatively large surface tension.

According to an aspect of the present invention, a solution or a dispersion containing the reaction layer forming material is applied and impregnated on the gas diffusion layer 8 with stepwise (or successive) varying of the surface tensions of the solution or the dispersion. Thus, a reaction layer can be formed in which the content of the reaction layer forming material gradually varies in the gas diffusion layer 8 from the surface portion to the portion adjacent to the substrate. Furthermore, the surface tension or the amount of application of the solution or the dispersion containing the reaction layer forming material may be suitably determined, thereby readily forming a reaction layer in which the reaction layer forming material has any distribution pattern in the depth direction.

According to an aspect of the present invention, in the method to apply and impregnate the solutions or the dispersions containing the reaction layer forming material, the solutions or the dispersions having different surface tensions, the solution or the dispersion is preferably applied and impregnated in ascending order of the surface tension. According to this method, a reaction layer can be readily formed in which the content of the reaction layer forming material is gradually decreased from the surface portion of the gas diffusion layer 8 to the first current-collecting layer.

Furthermore, according to an aspect of the present invention, the solution or the dispersion containing the reaction layer forming material is preferably applied such that each of the droplets of the solution or the dispersion has a predetermined interval. The above application reduces or prevents the reaction layer forming material composed of microparticles from agglomerating and allows a reaction layer in which the reaction layer forming material is uniformly dispersed to be formed. The intervals between applications of the solution or the dispersion containing the reaction layer forming material are not limited as long as the droplets of the solution or the dispersion containing the reaction layer forming material are not in contact with each other when being applied. In order to form a reaction layer having a uniform and desired amount of reaction layer forming material effectively, preferably, the droplet size is small (for example, 10 picoliters or less) and the interval between applications is sufficiently large (for example, about 0.1 to about 1 mm).

As described above, the steps of applying the solution or the dispersion containing the reaction layer forming material with the discharger 20f and impregnating the solution or the dispersion into the gas diffusion layer 8 are repeated. The solvent dissolving or dispersing the reaction layer forming material is then removed, thereby allowing the reaction layer forming material to be supported on the carbon particles.

The methods to remove the solvent dissolving or dispersing the reaction layer forming material include heating the substrate at normal pressure in an inert gas, and heating the substrate under reduced pressure. The latter method is preferably used.

The heating temperature is preferably as low as possible, more preferably, 100° C. or less, and most preferably, 50° C. or less. Furthermore, the time to remove the solvent is preferably as short as possible. The removal of the solvent over a long time and at a high temperature may break the uniform dispersion state of the reaction layer forming material formed by the discharger. In that case, a reaction layer in which the reaction layer forming material composed of microparticles is uniformly dispersed is not obtained.

FIG. 9 is a conceptual view of the state wherein a first reaction layer 10 is formed on the first gas diffusion layer 8 as described above. FIG. 9 shows the first reaction layer 10 in which the content of a particulate reaction layer forming material 10a is gradually decreased in the direction from the surface portion of the gas diffusion layer 8 to the portion adjacent to the substrate. In the conceptual view in FIG. 9, a part of the first gas diffusion layer 8 doubles as the first reaction layer 10.

FIG. 10 is an end view of the substrate 2 on which the first reaction layer 10 is formed as described above. The substrate 2 having the first reaction layer 10 is moved from the table 28 to the belt conveyor BC1. The belt conveyor BC1 carries the substrate 2 to the discharger 20g.

(6) Electrolyte Membrane Forming Step (S15)

Subsequently, the electrolyte membrane is formed on the substrate 2 having the first reaction layer 10 thereon. The substrate 2 carried by the belt conveyor BC1 to the discharger 20g is disposed on the table 28 to be taken in the discharger 20g. In the discharger 20g, an electrolyte membrane forming material provided in the tank 30 is discharged on the first reaction layer 10 through nozzles disposed on the nozzle-formed surface 26 to form an electrolyte membrane 12.

Examples of the electrolyte membrane forming material include a polymer electrolyte material prepared by micellizing a perfluorosulfonic acid polymer, for example, NAFION™ (DuPont) in a mixed solution composed of water and methanol in a ratio of 1:1 by weight, and a material including a ceramic solid electrolyte, for example, tungstophosphoric acid or molybdophosphoric acid, these materials being adjusted to have a predetermined viscosity (for example 20 mPa·s or less).

FIG. 11 is an end view of the substrate 2 on which the electrolyte membrane 12 is formed. As shown in FIG. 11, the electrolyte membrane 12 having a predetermined thickness is formed on the first reaction layer 10. The substrate 2 having the electrolyte membrane 12 is moved from the table 28 to the belt conveyor BC1. The belt conveyor BC1 carries the substrate 2 to the discharger 20h.

(7) Second Reaction Layer Forming Step (S16)

Subsequently, the second reaction layer is formed on the substrate 2 having the electrolyte membrane 12 thereon. The second reaction layer is formed on the substrate having the gas channels and the gas diffusion layer by applying a reaction layer forming material while supplying an inert gas through the gas channels.

The substrate 2 carried by the belt conveyor BC1 to the discharger 20h is disposed on the table 28 to be taken in the discharger 20h. In the discharger 20h, a second reaction layer 10' is formed by the same process performed in the discharger 20f. Examples of the second reaction layer 10' forming material include the same materials as in the first reaction layer.

FIG. 12 is an end view of the substrate 2 on which the second reaction layer 10' is formed. As shown in FIG. 12, the second reaction layer 10' is formed on the electrolyte membrane 12. In the second reaction layer 10', the reaction of a second reactive gas is performed. The substrate 2 having the second reaction layer 10' is moved from the table 28 to the belt conveyor BC1. The belt conveyor BC1 carries the substrate 2 to the discharger 20i.

(8) Second Gas Diffusion Layer Forming Step (S17)

Subsequently, the second gas diffusion layer is formed on the substrate 2 having the second reaction layer 10' thereon. The substrate 2 carried by the belt conveyor BC1 to the discharger 20i is disposed on the table 28 to be taken in the discharger 20i. In the discharger 20i, a second gas diffusion layer 8' is formed by the same process performed in the discharger 20e. Examples of the second gas diffusion layer 8' forming material include the same materials as in the first gas diffusion layer 8.

FIG. 13 is an end view of the substrate 2 on which the second gas diffusion layer 8' is formed. The substrate 2 having the second gas diffusion layer 8' is moved from the table 28 to the belt conveyor BC1. The belt conveyor BC1 carries the substrate 2 to the discharger 20j.

(9) Second Current-Collecting Layer Forming Step (S18)

Subsequently, the second current-collecting layer is formed on the substrate 2 having the second gas diffusion layer 8' thereon. The substrate 2 carried by the belt conveyor BC1 to the discharger 20j is disposed on the table 28 to be taken in the discharger 20j. A second current-collecting layer 6' is formed on the second gas diffusion layer 8' by the same process performed in the discharger 20*d*. Examples of the second current-collecting layer 6' forming material include the same materials as in the first current-collecting layer forming material. The substrate 2 having the second current-collecting layer 6' is moved from the table 28 to the belt conveyor BC1. The belt conveyor BC1 carries the substrate 2 to the discharger 20*k*.

(10) Second Supporter Material Applying Step (S19)

Subsequently, the substrate 2 carried by the belt conveyor BC1 to the discharger 20*k* is disposed on the table 28 to be taken in the discharger 20*k*. The second supporter material is applied by the same process performed in the discharger 20*c*. Examples of the second supporter material include the same materials as in the first supporter material.

FIG. 14 is an end view of the substrate 2 on which the second current-collecting layer 6' and the second supporter material 4' are applied. The second supporter material 4' is formed on the second current-collecting layer 6' so as to be located in each of the second gas channels formed in the second substrate, which is to be laminated on the substrate 2.

(11) Second Substrate Assembling Step (S20)

Subsequently, the substrate 2 (i.e., first substrate) on which the second supporter material 4' is applied and the second substrate 2' having the second gas channels, and which is prepared separately, are laminated. The lamination of the first substrate and the second substrate is performed by bonding the two substrates such that the second supporter material 4' formed on the first substrate 2 is located in each of the second gas channels formed on the second substrate. The material used for the second substrate may be the same as that of the first substrate. The formation of each of the second gas channels is performed using the dischargers 20*l* and 20*m* by the same processes performed in the dischargers 20*a* and 20*b*, respectively.

The method described above allows the fuel cell shown in FIG. 15 to be manufactured. The fuel cell shown in FIG. 15 includes, from the bottom of the figure, the first substrate 2, the first gas channels 3 formed on the first substrate 2, the first supporter material 4 located in the first gas channels 3, the first current-collecting layer 6 formed on the first substrate 2 and the first supporter material 4, the first gas diffusion layer 8, the first reaction layer 10 formed on the first gas diffusion layer 8, the electrolyte membrane 12, the second reaction layer 10', the second gas diffusion layer 8', the second current-collecting layer 6', the second gas channels 3', the second supporter material 4' located in the second gas channels 3', and the second substrate 2'.

According to the fuel cell shown in FIG. 15, the first reaction layer 10 and the second reaction layer 10' are composed of the reaction layer forming material supported on carbon particles. Furthermore, the content of the reaction layer forming material in the reaction layer is larger at the electrolyte membrane than at the current-collecting layer. Accordingly, reaction layers having a uniform and desired amount of metal microparticles are formed efficiently. Thus, a fuel cell can be manufactured at low cost and has high power density, i.e. superior characteristic.

In the fuel cell shown in FIG. 15, the second substrate 2' is disposed such that the U-shaped first gas channels formed in the first substrate 2 extending from one side face to the other side face run parallel to the second gas channels formed in the second substrate 2'.

The type of fuel cell according to the present exemplary embodiment is not limited. Examples of the fuel cell include a polymer electrolyte fuel cell, a phosphoric acid fuel cell, and a direct methanol fuel cell.

The fuel cell shown in FIG. 15 operates as follows. A first reactive gas is introduced from the first gas channels 3 of the first substrate 2 and is uniformly diffused by the first gas diffusion layer 8. The diffused first reactive gas is allowed to react at the first reaction layer 10 to generate ions and electrons. The electrons are collected in the first current-collecting layer 6 and are then conducted to the second current-collecting layer 6' of the second substrate 2'. The ions generated from the first reactive gas are moved through the electrolyte membrane 12 to the second reaction layer 10'. On the other hand, the second reactive gas is introduced from the second gas channels 3' of the second substrate 2' and is uniformly diffused by the second gas diffusion layer 8'. The diffused second reactive gas is allowed to react with the ions moved through the electrolyte membrane 12 and the electrons transmitted from the second current-collecting layer 6' at the second reaction layer 10'. For example, when the first reactive gas is hydrogen gas and the second reactive gas is oxygen gas, a reaction $H_2 \rightarrow 2H^+ + 2e^-$ is performed in the first reaction layer 10 and a reaction $1/2O_2 + 2H^+ + 2e^- \rightarrow H_2O$ is performed in the second reaction layer 10'.

According to the exemplary embodiment described above, although dischargers are used in all steps in the method to produce the fuel cell, dischargers need not be used in all the steps of manufacturing the fuel cell. For example, the step of forming the first reaction layer and/or the second reaction layer may be performed using the dischargers to apply the reaction layer forming material, and other steps may be performed using related art steps to manufacture the fuel cell. Even the above method reduces the cost of manufacturing the fuel cell, because the method allows the reaction layer to be formed without using microelectromechanical systems (MEMS).

In order to form the gas channels, although a resist pattern is formed on the substrate and the resist pattern is etched with an aqueous hydrofluoric acid solution in the method of the exemplary embodiment described above, the gas channels may be formed without forming the resist pattern. Alternatively, the substrate may be disposed in a fluorine gas atmosphere and water may be discharged at the predetermined positions on the substrate, thereby forming the gas channels. Furthermore, a gas channels forming material may be applied on the substrate with a discharger to form the gas channels.

According to a method of the exemplary embodiment described above, a part of the fuel cell adjacent to the first substrate in which the first reactive gas is supplied is formed in advance and the second substrate is laminated lastly to manufacture the fuel cell. Instead, a part of the fuel cell adjacent to the second substrate in which the second reactive gas is supplied may be formed in advance.

According to a method of the exemplary embodiment described above, although the second supporter material is applied in a direction parallel to the first gas channels formed on the first substrate, the second supporter material may be applied such that each of the applied areas of the second supporter material and each of the first gas channels intersect. For example, the second supporter material may be applied in a direction perpendicular to the first gas channels formed on the first substrate, i.e., in the direction extending from the right side face to the left side face in FIG. 5(B). In this case, a fuel cell is formed in which the second substrate is disposed such that the second gas channels formed on the second substrate and the first gas channels formed on the first substrate intersect at right angles.

According to a method of the exemplary embodiment described above, the first current-collecting layer the first reaction layer, the electrolyte membrane, the second reaction layer, and the second current-collecting layer are formed in that order on the first substrate having the first gas channels thereon. Alternatively, the current-collecting layer, the reaction layer, and the electrolyte membrane may be separately formed on each of the first substrate and the second substrate, and last, the first substrate and the second substrate may be bonded together to manufacture the fuel cell.

The fuel cell manufacturing line according to the present exemplary embodiment includes a first manufacturing line to process the first substrate and a second manufacturing line to process the second substrate and the processes in both of the manufacturing lines are concurrently performed. Since the processes for the first substrate and the processes for the second substrate can be concurrently performed, the fuel cell can be manufactured rapidly.

3) Electronic Device and Automobile

An electronic device according to an aspect of the present invention is provided with the fuel cell described above as a power supply. Examples of the electronic device may include cellular phones, personal handy-phone systems (PHS), mobile computers, notebook sized-personal computers, personal digital assistants (PDA) and portable video telephones. Furthermore, the electronic device according to an aspect of the present invention may include other functions such as, games, data communication functions, recording and playback functions and dictionaries. The electronic device according to an aspect of the present invention is provided with clean energy as a power supply that considers the global environment properly.

An automobile according to an aspect of the present invention is provided with the fuel cell described above as a power supply. According to a method of an aspect of the present invention, a plurality of fuel cells may be laminated, thereby manufacturing a large-scaled fuel cell. As shown in FIG. 16, other gas channels are formed on the reverse-side of the already-manufactured substrate 2'. On the reverse-side of the substrate of the substrate 2' having the gas channels thereunder, for example, gas diffusion layers, reaction layers, and an electrolyte membrane may be formed by the same steps of the above method to manufacture the fuel cell, to laminate the fuel cells. Thus, a large-scaled fuel cell can be manufactured. The automobile according to an aspect of the present invention is provided with clean energy as a power supply that considers the global environment properly.

Figure 1:
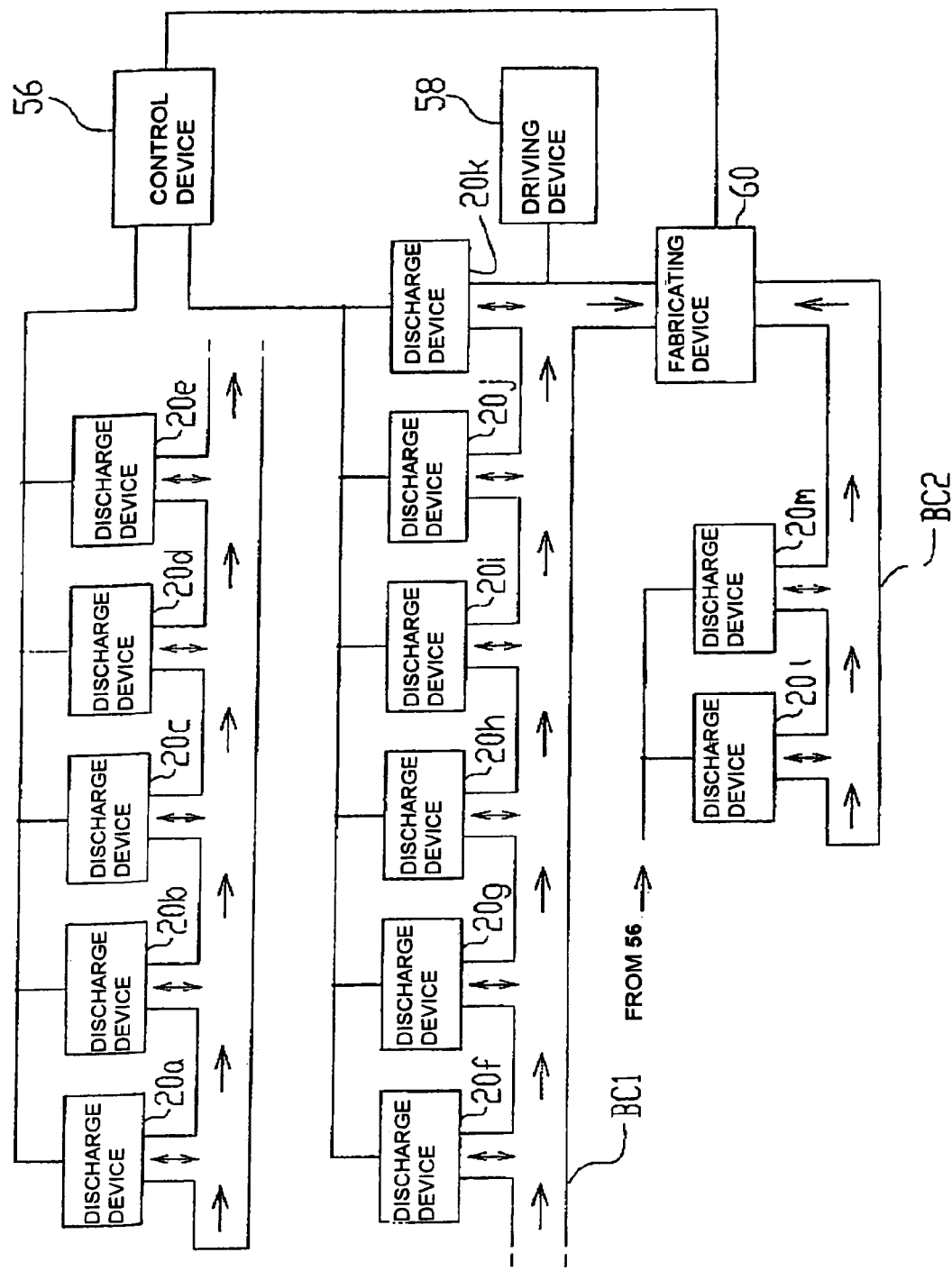
FIG. 1 is a schematic showing an example of a fuel cell manufacturing line according to an exemplary embodiment.
Figure 2:
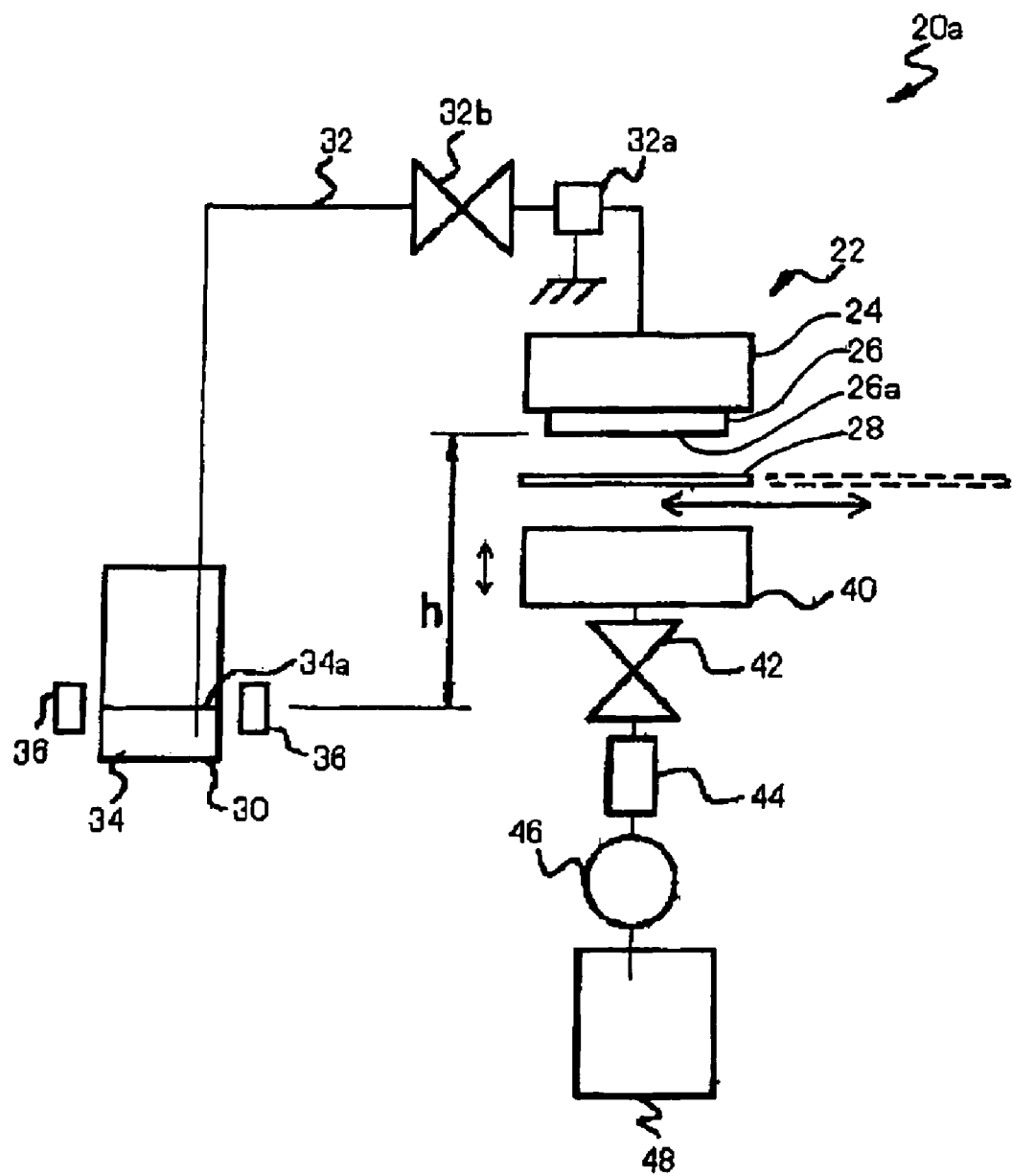
FIG. 2 is a schematic view of an ink-jet type discharger according to an exemplary embodiment.
Figure 3:
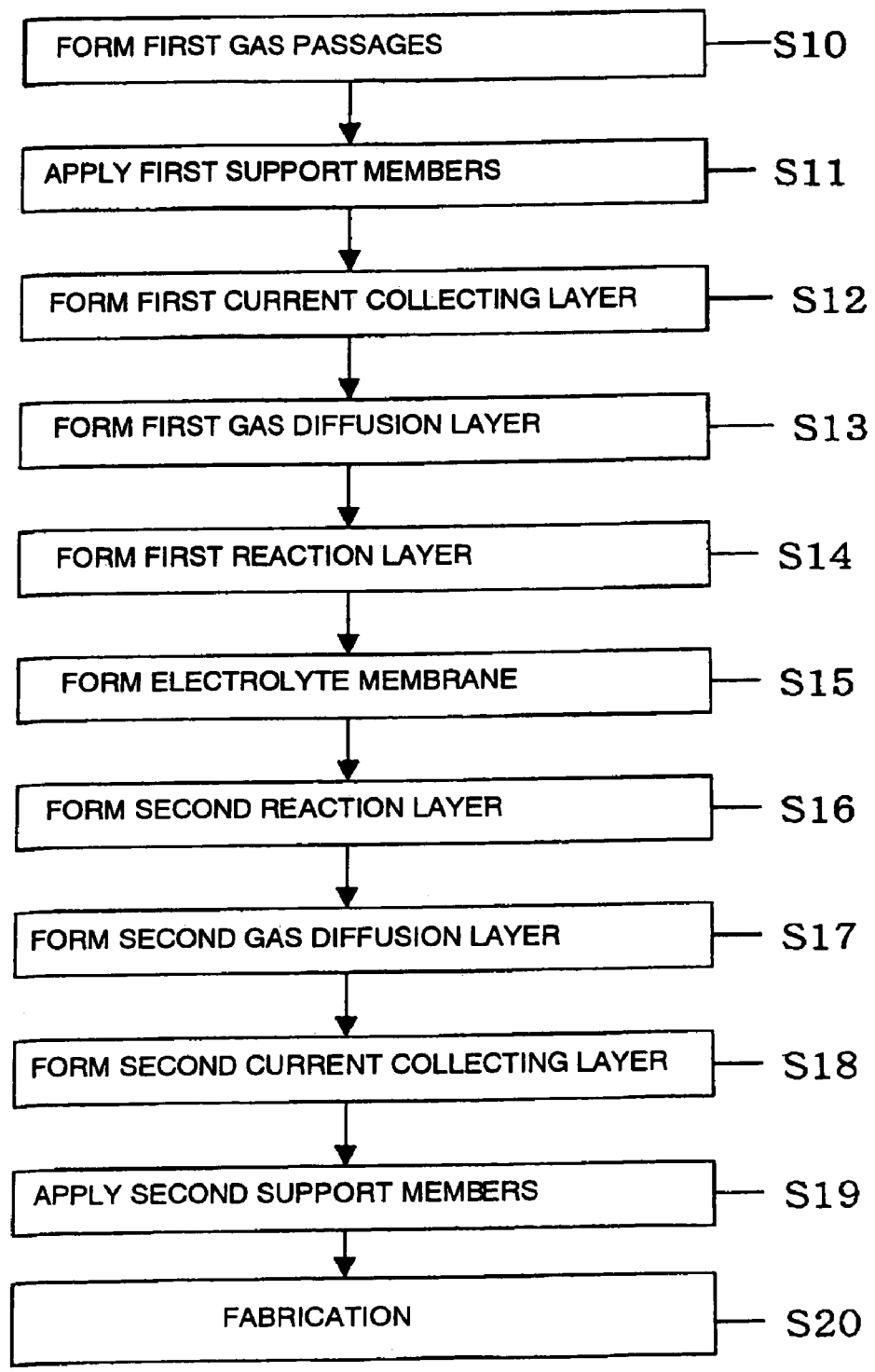
FIG. 3 is a flowchart showing the method to manufacture a fuel cell according to an exemplary embodiment.
Figure 4:
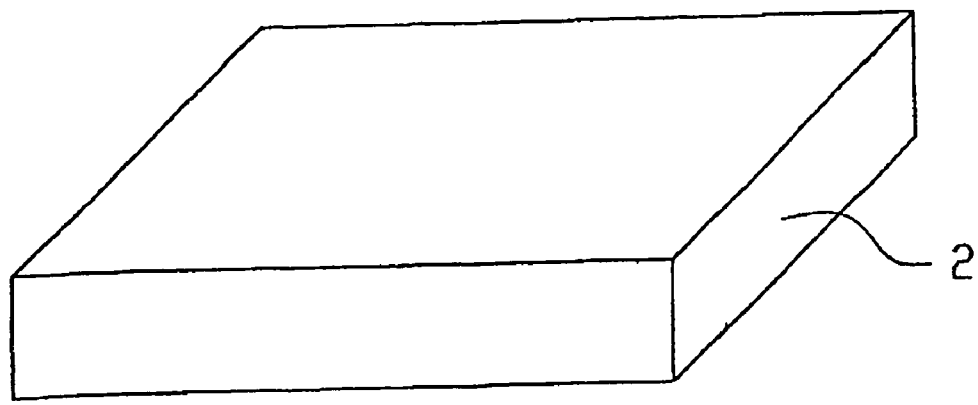
FIGS. 4A and 4B are end views of a substrate in a step of manufacturing the fuel cell according to an exemplary embodiment.
Figure 4:
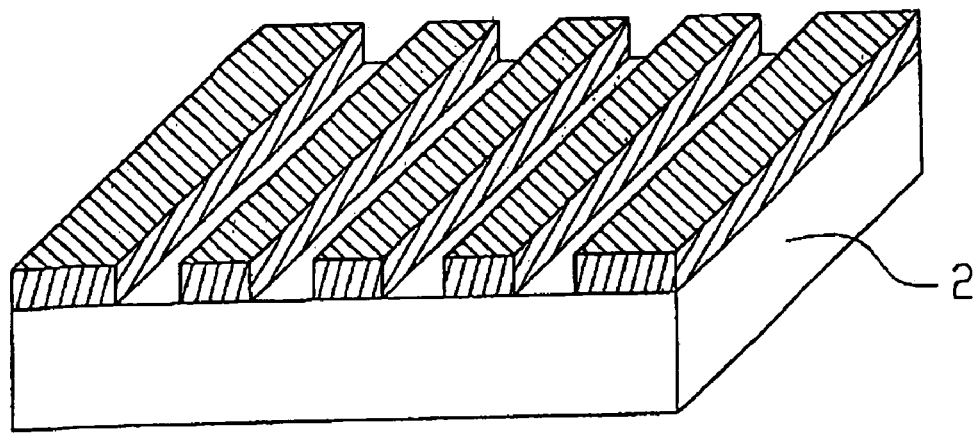
Figure 5:
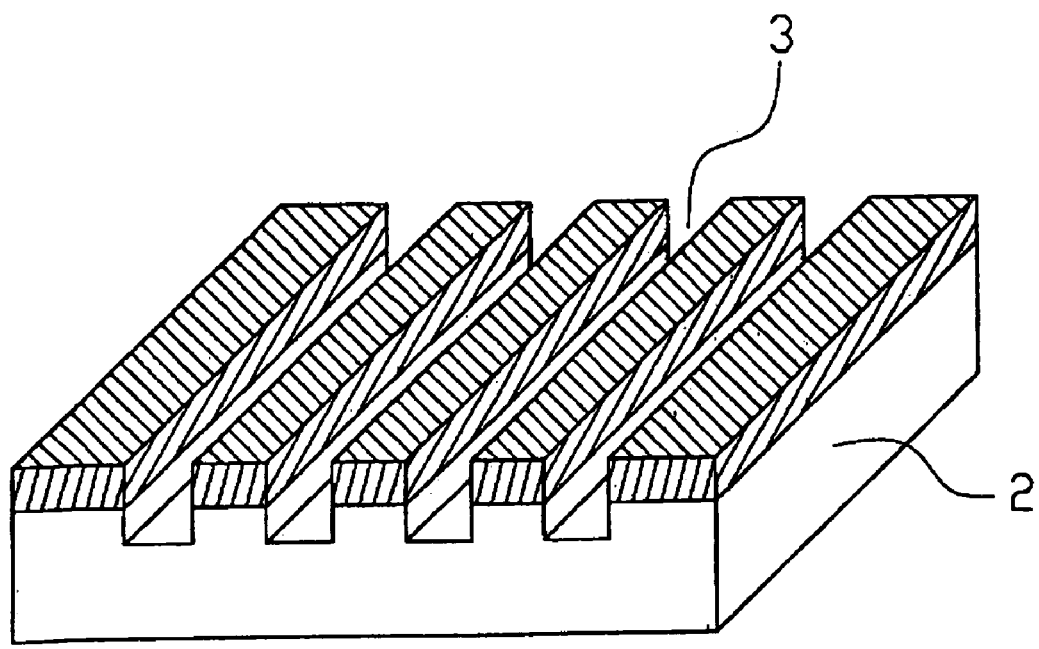
FIGS. 5A and 5B are explanatory views of a process to form gas channels according to an exemplary embodiment.
Figure 5:
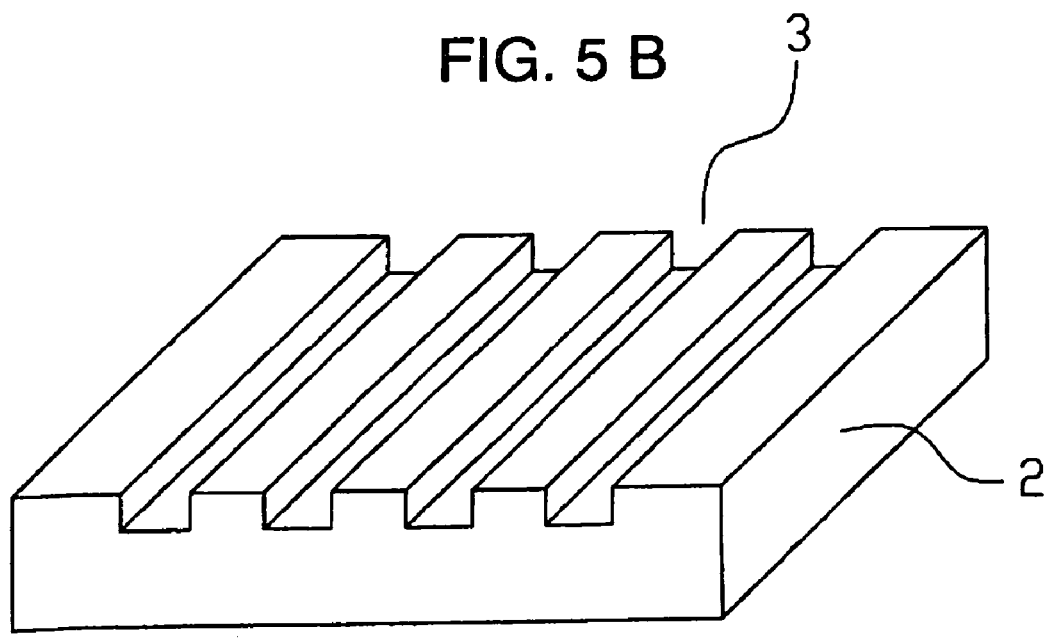
Figure 6:
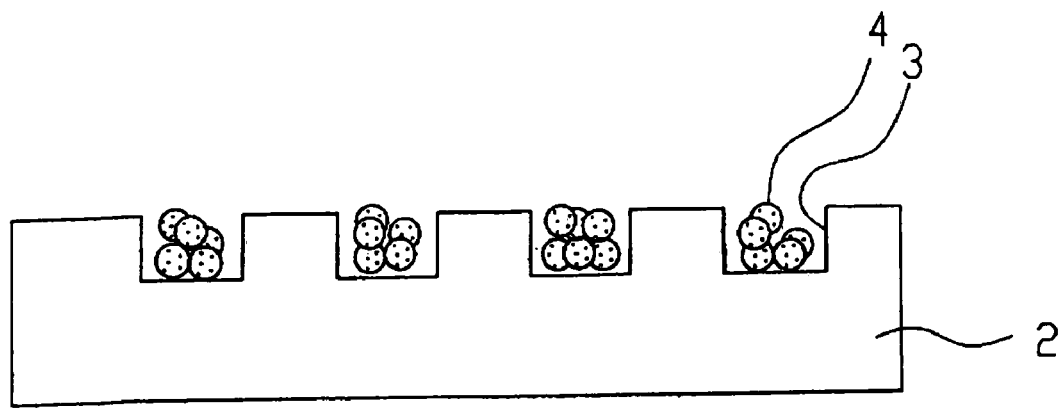
FIG. 6 is an end view of the substrate in a step of manufacturing the fuel cell according to an exemplary embodiment.
Figure 7:
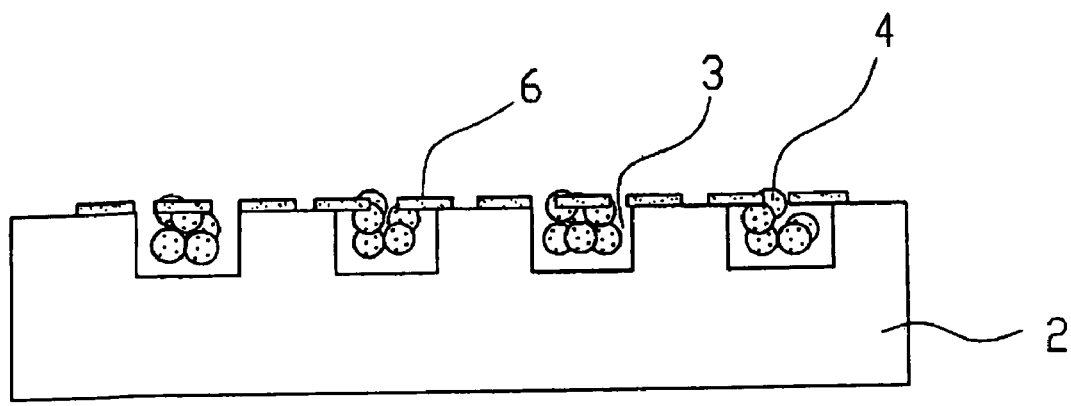
FIG. 7 is an end view of the substrate in a step of manufacturing the fuel cell according to an exemplary embodiment.
Figure 8:
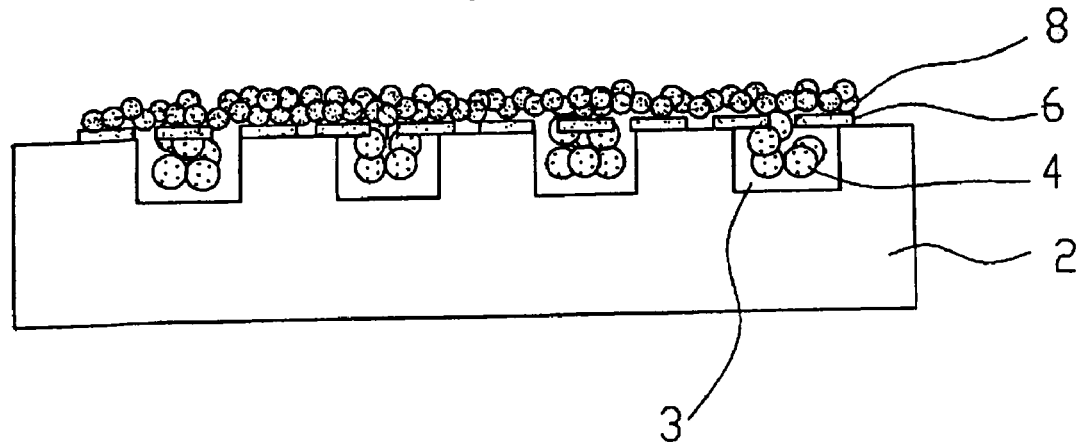
FIG. 8 is an end view of the substrate in a step of manufacturing the fuel cell according to an exemplary embodiment.
Figure 9:
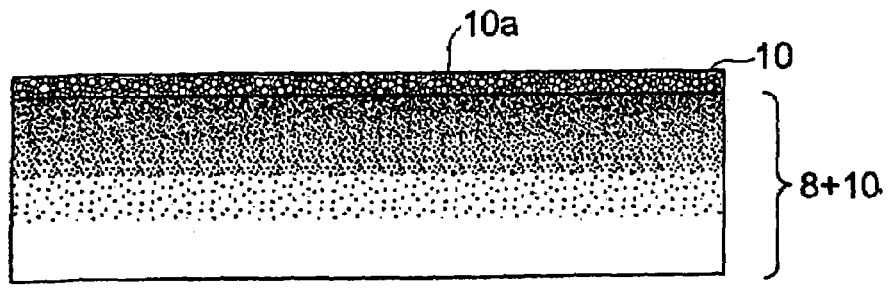
FIG. 9 is a conceptual view of a reaction layer according to an exemplary embodiment.
Figure 10:
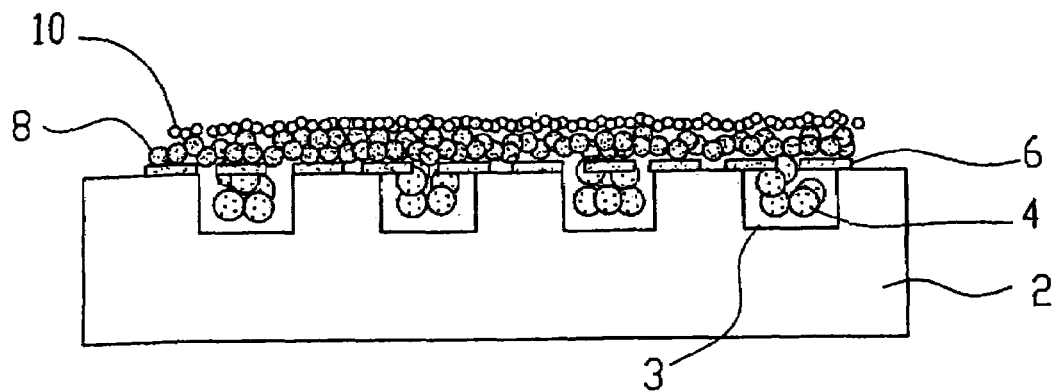
FIG. 10 is an end view of the substrate in a step of manufacturing the fuel cell according to an exemplary embodiment.
Figure 11:
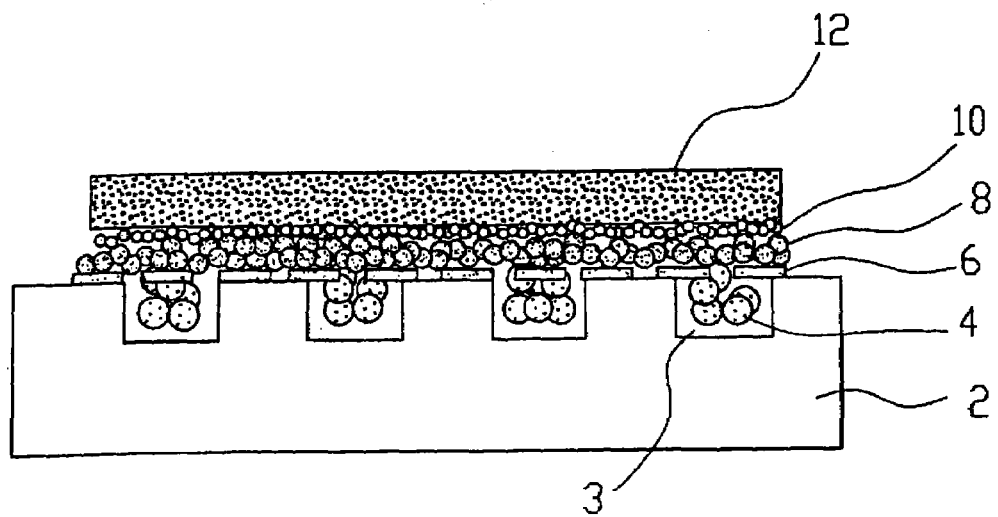
FIG. 11 is an end view of the substrate in a step of manufacturing the fuel cell according to an exemplary embodiment.
Figure 12:
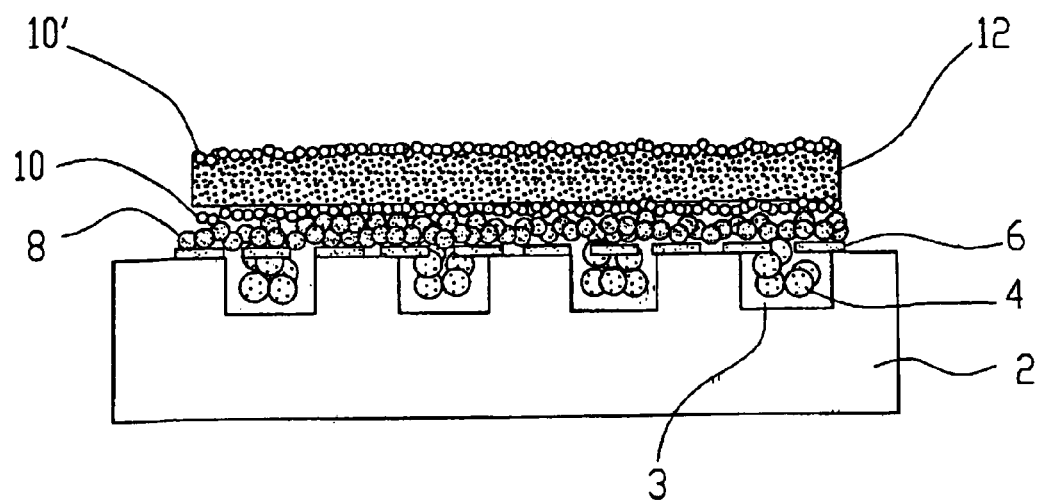
FIG. 12 is an end view of the substrate in a step of manufacturing the fuel cell according to an exemplary embodiment.
Figure 13:
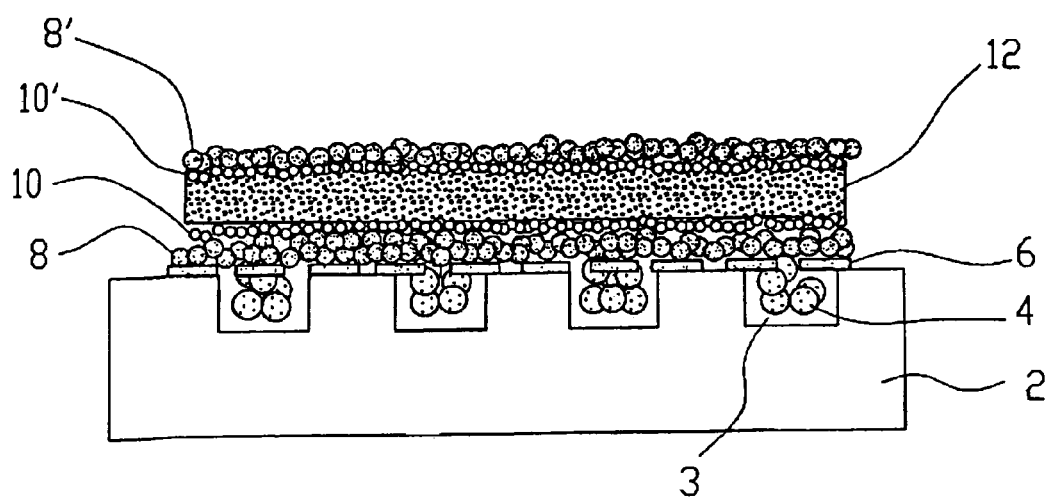
FIG. 13 is an end view of the substrate in a step of manufacturing the fuel cell according to an exemplary embodiment.
Figure 14:
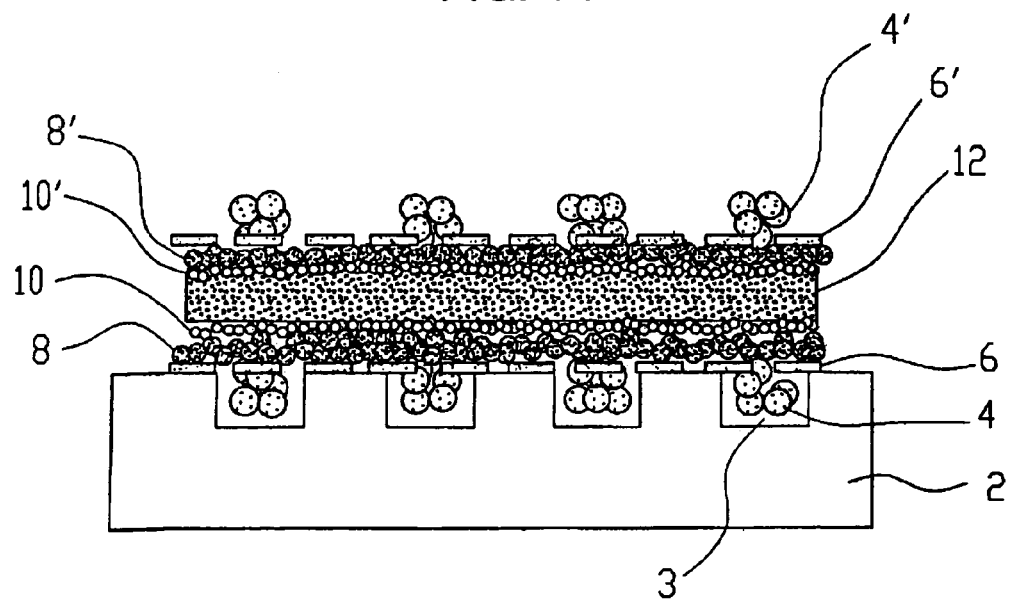
FIG. 14 is an end view of the substrate in a step of manufacturing the fuel cell according to an exemplary embodiment.
Figure 15:
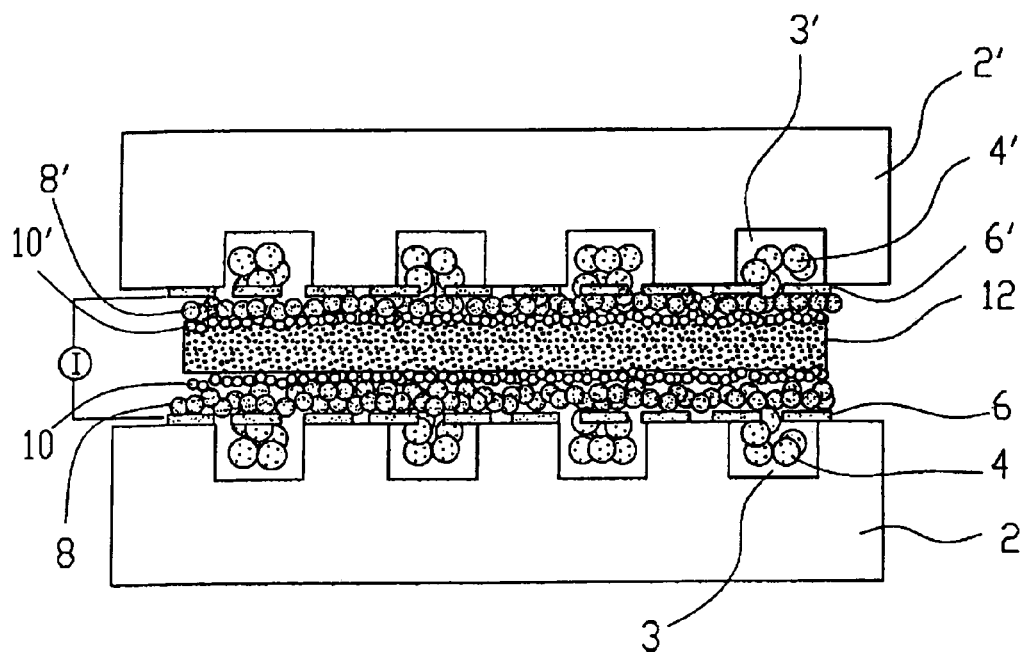
FIG. 15 is an end view of the fuel cell according to an exemplary embodiment.
Figure 16:
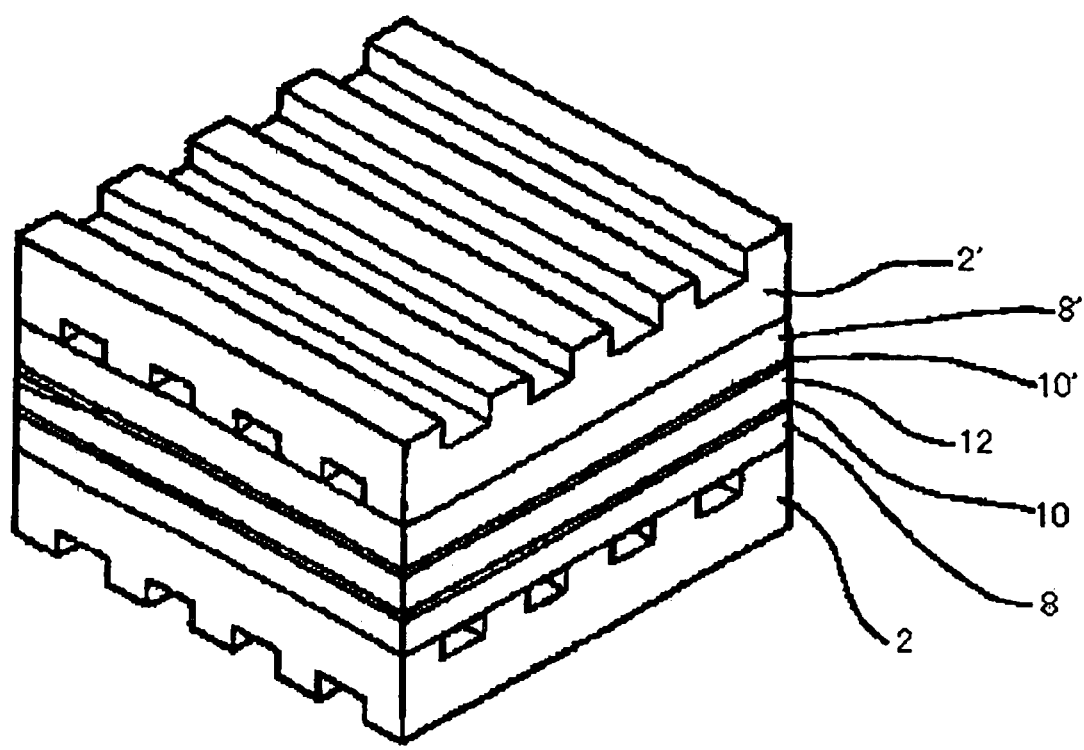
FIG. 16 is a view of a large-scaled fuel cell manufactured by laminating the fuel cells according to an exemplary embodiment.

What is claimed is:

1. A method to form a functional porous layer including a functional material that is supported on a porous material, the method comprising:
    etching a substrate to form at least one gas channel;
    applying a first supporter layer within the at least one gas channel, wherein the first supporter layer comprises carbon or glass particles; and
    applying a plurality of solutions or dispersions containing the functional material, the solutions or the dispersions having different surface tensions, to a porous layer to control the permeation of the functional material in the depth direction of the porous layer according to the difference in the surface tensions, wherein the functional material is at least partially supported by the first supporter material.

2. The method to form a functional porous layer according to claim 1, further comprising:
    removing solvents in the solutions or the dispersions.

3. The method to form a functional porous layer according to claim 1, wherein the content of the functional material varies in the depth direction of the porous layer.

4. The method to form a functional porous layer according to claim 1, applying the solutions or the dispersions containing the functional material to the porous layer to impregnate the solutions or the dispersions containing the functional material in the porous layer being repeated a plurality of times for at least one of the solutions or dispersions having different surface tensions.

5. The method to form a functional porous layer according to claim 4, each of the solutions or the dispersions having different surface tensions having different concentrations of the functional material.

6. The method to form a functional porous layer according to claim 1, further comprising:
    applying a first solution or a first dispersion containing the functional material to the porous layer to impregnate the first solution or the first dispersion containing the functional material in the porous layer; and
    applying a second solution or a second dispersion containing the functional material to the porous layer to impregnate the second solution or the second dispersion containing the functional material in the porous layer, the second solution or the second dispersion having a surface tension larger than the surface tension of the first solution or the first dispersion.

7. The method to form a functional porous layer according to claim 1, the solutions or the dispersions being prepared by dissolving or dispersing the functional material in different solvents.

8. The method to form a functional porous layer according to claim 1, the porous layer comprising carbonaceous particles.

9. The method to form a functional porous layer according to claim 1, the functional porous layer comprising carbonaceous particles that support microparticles of at least one metal selected from the group consisting of platinum, rhodium, ruthenium, iridium, palladium, osmium and an alloy composed of two or more of those elements.

10. The method to form a functional porous layer according to claim 1, the solution or the dispersion containing the functional material including at least one metal microparticle selected from the group consisting of platinum, rhodium, ruthenium, iridium, palladium, osmium and an alloy composed of two or more of those elements, or at least one compound of the metal.

11. The method to form a functional porous layer according to claim 1, the functional porous layer being at least one of a first reaction layer and a second reaction layer of a fuel cell that includes a first current-collecting layer, the first reaction layer, an electrolyte membrane, the second reaction layer, and a second current-collecting layer in that order.

12. The method to form a functional porous layer according to claim 1, the solution or the dispersion containing the functional material being applied with a discharger.

13. A method to manufacture a fuel cell including a first current-collecting layer, a first reaction layer, an electrolyte membrane, a second reaction layer, and a second current-collecting layer, the method comprising:
    etching a substrate to form at least one gas channel;
    applying a first supporter layer within the at least one gas channel, wherein the first supporter layer comprises carbon or glass particles;
    applying a plurality of solutions or dispersions to a porous layer having carbonaceous particles, the plurality of solutions or dispersions containing a reaction layer forming material and having different surface tensions, wherein the plurality of solutions or dispersions are at least partially supported by the first supporter layer; and
    removing solvents in the solutions or the dispersions to form at least one of the first reaction layer and the second reaction layer.

14. The method to manufacture a fuel cell according to claim 13, at least one of the first reaction layer and the second reaction layer comprising a reaction layer forming material supported on the carbonaceous particles, the content of the reaction layer forming material varying in the depth direction of the porous layer comprising the carbonaceous particles.

15. The method to manufacture a fuel cell according to claim 13, applying the solutions or the dispersions containing the reaction layer forming material to the porous layer to impregnate the solutions or the dispersions containing the reaction layer forming material in the porous layer comprising carbonaceous particles being repeated a plurality of times for at least one of the solutions or dispersions having different surface tensions.

16. The method to manufacture a fuel cell according to claim 13, at least one of the first reaction layer and the second reaction layer being formed by:
    applying a first solution or a first dispersion containing the reaction layer forming material to the porous layer comprising the carbonaceous particles to impregnate the first solution or the first dispersion containing the reaction layer forming material in the porous layer; and
    applying a second solution or a second dispersion containing the reaction layer forming material to the porous layer comprising the carbonaceous particles to impregnate the second solution or the second dispersion containing the reaction layer forming material in the porous layer, the second solution or the second dispersion having a surface tension larger than the surface tension of the first solution or the first dispersion.

17. The method to manufacture a fuel cell according to claim 13, the solutions or the dispersions containing the reaction layer forming material having different surface tensions being prepared by dissolving or dispersing the reaction layer forming material in different solvents.

18. The method to manufacture a fuel cell according to claim 13, further comprising:
    applying carbonaceous particles on the first current-collecting layer or the second current-collecting layer to form the porous layer comprising the carbonaceous particles.

19. The method to manufacture a fuel cell according to claim 13, the solution or the dispersion containing the reaction layer forming material being applied with a discharger.

20. The method to manufacture a fuel cell according to claim 13, at least one of the first reaction layer and the second reaction layer comprises the carbonaceous particles that support metal microparticles, and the content of the metal microparticles in the reaction layer is larger at the electrolyte membrane than at the current-collecting layer.

21. An electronic device provided with a fuel cell manufactured by a method according to claim 13 as a power supply.

22. An automobile provided with a fuel cell manufactured by a method according to claim 13 as a power supply.

* * * * *